(No Model.)

P. GOOD.
BIBBED VALVE.

No. 548,048.

Patented Oct. 15, 1895.

WITNESSES:
Charles W. Marvin.
Jessie E. Murray

INVENTOR
Peter Good

BY
Smith & Denison
ATTORNEYS.

UNITED STATES PATENT OFFICE.

PETER GOOD, OF WILKES-BARRÉ, PENNSYLVANIA.

BIBBED VALVE.

SPECIFICATION forming part of Letters Patent No. 548,048, dated October 15, 1895.

Application filed March 1, 1895. Serial No. 540,133. (No model.)

*To all whom it may concern:*

Be it known that I, PETER GOOD, of Wilkes-Barré, in the county of Luzerne, in the State of Pennsylvania, have invented new and useful Improvements in Bibbed Valves, of which the following, taken in connection with the accompanying drawings, is a full, clear, and exact description.

This invention relates to bibbed valves.

My object is to produce a bibbed valve and cock so arranged and constructed that the seat of valve can be easily refaced and readily replaced when worn out; and to that end my invention consists in constructing the cock in two parts, providing means for securing them together, so that the valve may be readily exposed for the purpose of refacing and replacing the washer when desired, and in the several other new and novel features and combination of parts hereinafter described, and which are specifically set forth in the claims hereunto annexed. It is constructed as follows, reference being had to the accompanying drawings, in which—

Figure 1:
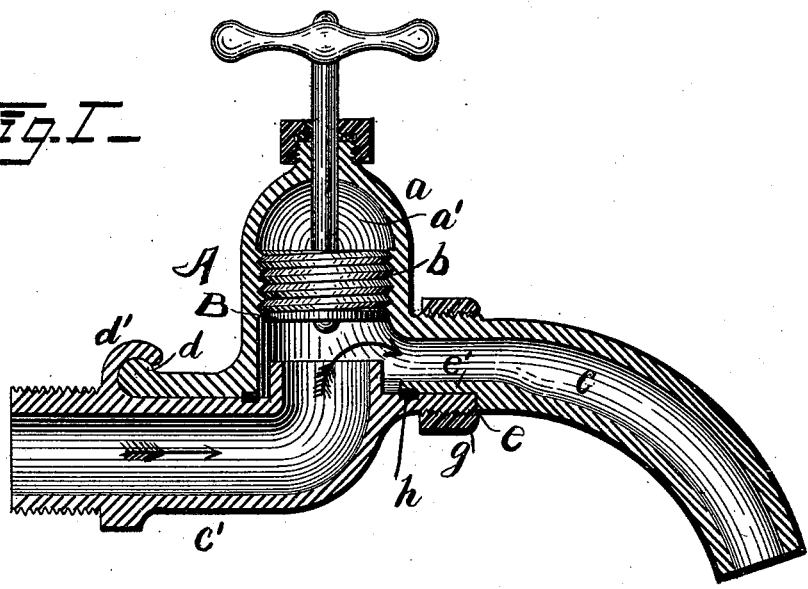
Figure 2:
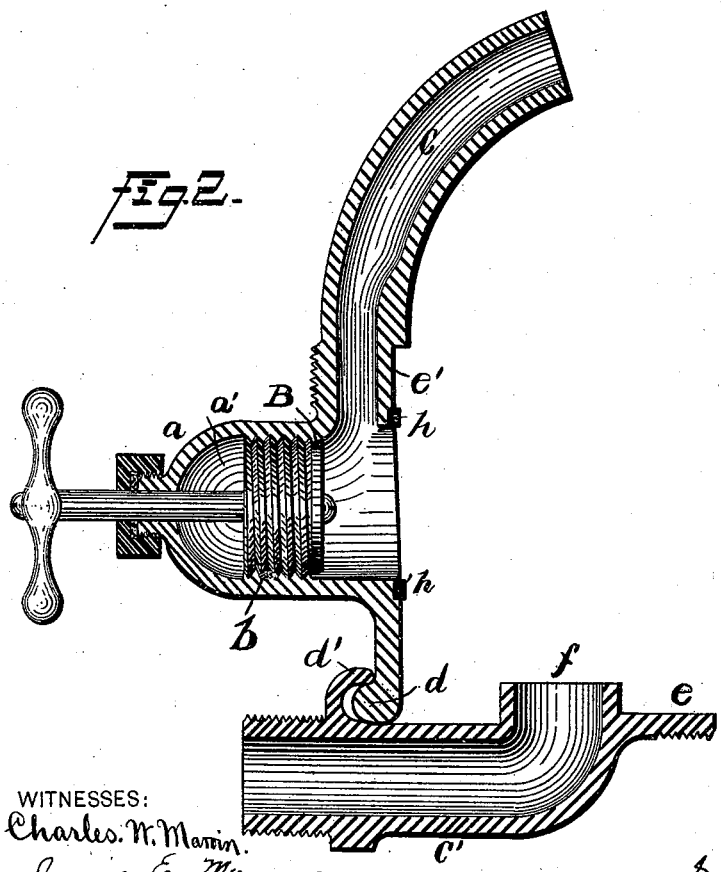

Figure 1 is a longitudinal vertical section through the cock, showing the valve and valve-seat. Fig. 2 is a similar view showing the inlet-pipe removed for the purpose of exposing the valve, so that the washer may be replaced and seat refaced.

A is the cock constructed in two parts, one part $a$ containing the valve-recess $a'$, the valve $b$, mounted thereon, and the exit-nozzle $c$, the rear end of the part $a$ being provided with the lug $d$. The other part of the cock $c'$ comprises the inlet-pipe, and is provided upon its inner side with a hook $d$, and its forward end is provided with a projection $e$, threaded on one side. The nozzle $c$ has a cut-away portion $e'$ on its inner side to admit of the projection $e$. The upturned end $f$ of the part $c'$ extends upward a sufficient distance, so that it can be easily and readily ground down when the same becomes roughened through use.

B is a washer secured upon the lower face of the valve $b$ and adapted to rest upon the top $f$ of the inlet-pipe when in position, so that when the valve is screwed or forced down onto the top of said pipe the washer will keep the water back.

$g$ is a nut securing the inlet pipe or part $c'$ to the part $a$ at one end, the other end being held by the hook $d'$, engaging with the lug $b$, $h$ being the washer or gasket interposed so as to make a tight joint.

Having described my invention, what I claim, and desire to secure by Letters Patent, is—

In a valve, the inlet pipe provided with a hook, a valve seat, and the extension on the front end of the pipe; combined with the upper portion of the frame, provided with a lug, the valve chamber, and the outlet pipe; the vertically moving valve, and a band or ring which is passed over the outlet pipe and extension, substantially as described.

In witness whereof I have hereunto set my hand on this 16th day of February, 1895.

PETER GOOD.

In presence of—
CLARA J. LAFU,
LILLIAN BENNETT,
FRANK W. LARNED.